United States Patent [19]

Ohsawa et al.

[11] Patent Number: 4,708,833
[45] Date of Patent: Nov. 24, 1987

[54] METHOD FOR PRODUCING ELASTOMERIC OPTICAL FIBER

[75] Inventors: Yoshitaka Ohsawa; Yutaka Shibata; Shin-ichiro Niwa; Akira Nishimura; Takafumi Uemiya, all of Osaka, Japan

[73] Assignee: Sumitomo Electric Industries, Ltd., Osaka, Japan

[21] Appl. No.: 862,797

[22] Filed: May 13, 1986

[30] Foreign Application Priority Data

May 13, 1985 [JP] Japan .................... 60-101729
May 13, 1985 [JP] Japan .................... 60-101730

[51] Int. Cl.⁴ .................... B29D 11/00; G02B 6/02
[52] U.S. Cl. .................... 264/1.5; 264/127; 264/174; 350/96.34
[58] Field of Search .................... 264/1.1, 1.5, 1.4, 22, 264/174, 127; 350/96.34

[56] References Cited

U.S. PATENT DOCUMENTS

| 3,556,635 | 1/1971 | Schrenk et al. | 264/1.5 |
| 4,133,664 | 1/1979 | Aulich et al. | 264/1.5 |
| 4,380,367 | 4/1983 | Suzuki | 350/96.34 |
| 4,431,264 | 2/1984 | Clarke | 350/96.34 |

FOREIGN PATENT DOCUMENTS 27625  2/1985  Japan .................... 264/1.5

Primary Examiner—James Lowe
Attorney, Agent, or Firm—Cushman, Darby & Cushman

[57] ABSTRACT

An elastomeric optical fiber comprising a core made of an elastomer with rubbery elasticity and a cladding surrounding the core and having low attenuation of light transmission is produced by a method comprising flowing down a liquid polymer for the core with crosslinking it, and simultaneously with or after the formation of the core, providing the cladding around the core.

13 Claims, 2 Drawing Figures

METHOD FOR PRODUCING ELASTOMERIC OPTICAL FIBER

FIELD OF THE INVENTION

The present invention relates to a method for producing an elastomeric optical fiber. More particularly, it relates to a method for producing an elastomeric optical fiber comprising a core made of an elastomer with rubber elasticity and a cladding surrounding the core.

BACKGROUND OF THE INVENTION

A plastic optical waveguide made of a thermoplastic polymer with no rubber elasticity such as polymethyl methacrylate is known and practically used. However, any optical waveguide made of an elastomer with rubber elasticity has not been practically used since it has very large attenuation of light transmission due to roughness of the core surface caused during the production of the optical fiber.

One of the methods for producing an elastomeric optical fiber comprises pouring a liquid polymer for forming the core in a hollow member such as a tube which may be used as a cladding, cross-linking the polymer by, for example, heating and releasing the cross-linked core from the hollow member to obtain a core when the member is not used as the cladding. In this method, the roughness of the inner surface of the hollow member is transferred onto the surface of the released core. When the hollow member as such is used as the cladding, irregularities such as peeling at an interface between the core and the cladding are formed since the liquid polymer shrinks during cross-linking. The surface roughness or the irregularities of the interface result in increase of attenuation of light transmission. In addition, since the liquid polymer should be poured in the hollow member by this method, the optical fiber cannot be longer than about 10 m.

SUMMARY OF THE INVENTION

One object of the present invention is to provide a method for producing an elastomeric optical fiber comprising a core made of an elastomer with rubber elasticity and a cladding and having less attenuation of light transmission.

Another object of the present invention is to provide a method for producing an elastomeric optical fiber comprising a core a surface of which has less roughness.

Further object of the present invention is to provide a method for continuously producing a comparatively long elastomeric optical fiber.

Accordingly, the present invention provides a method for producing an elastomeric optical fiber comprising a core made of an elastomer with rubber elasticity and a cladding surrounding the core, which method comprises flowing down a liquid polymer for the core with cross-linking it, and simultaneously with or after the formation of the core, providing the cladding around the core.

DETAILED DESCRIPTION OF THE INVENTION

According to the present invention, the core is formed by flowing down the liquid polymer from a nozzle and simultaneously cross-linking it.

To form the core, any liquid polymer that has rubber elasticity after cross-linked may be used. Specific examples of the liquid polymer are liquid butadiene polymer, liquid fluorine-containing polymer, liquid siloxane polymer, liquid acrylonitrile-butadiene copolymer and mixtures thereof. Among them, preferred are liquid siloxane polymers, particularly liquid dimethylsiloxane polymer and liquid siloxane polymer having phenyl or naphthyl groups.

The liquid polymer may contain an additive for adjusting a refractive index of the core. Examples of the additive are silicon oxide, germanium oxide, organic compounds having aromatic groups and the like.

When the cross-linking is induced by heating, the liquid polymer may contain a cross-linking agent and/or a cross-linking catalyst. Examples of the cross-linking agent are organic peroxides (e.g. benzoyl peroxide), sulfur and the like, and examples of the cross-linking catalyst are platinum, platinum complex, chloroplatinic acid, rhodium complex and the like.

The present invention will be illustrated, by way of example, with reference to the accompanying drawings.

Figure 1:
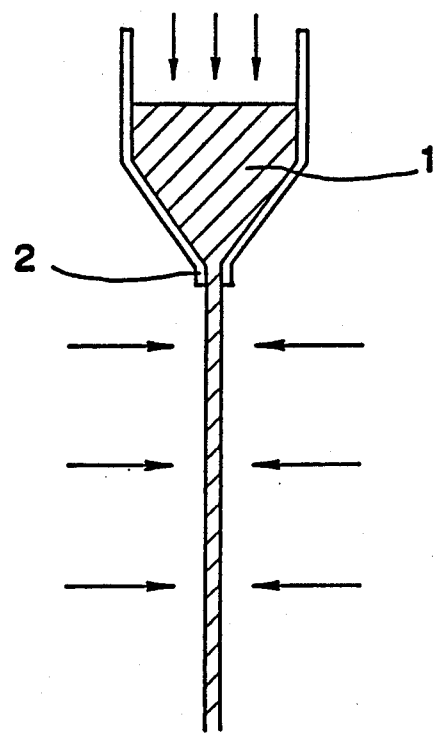
FIGS. 1 and 2 schematically show methods for producing an elastomeric optical fiber according to the present invention.

As shown in FIG. 1, the liquid polymer for the core is supplied from a feed tank 1 to a nozzle 2 and flowed down. The feed tank may be pressurized.

The stream of the polymer is irradiated with a cross-linking source from at least one direction cross-link the polymer.

Specific examples of the cross-linking source are radiation (e.g. $\alpha$-ray, $\beta$-ray, $\gamma$-ray and X-ray), ultraviolet light, heat and the like. Among them, preferred is $\beta$-ray, namely accelerated electron ray. Heating may be carried out with infrared light or a heater.

A dose of the radiation depends on the liquid polymer to be cross-linked. Usually, it is 0.1 to 100 Mrad, preferably 1 to 40 Mrad. Heating temperature also depends on the liquid polymer, and is usually 70° to 300° C.

The cladding may be formed on the cross-linked core by a conventional method, for example, by dip coating. The cladding may be made of an elastomer or a non-elastomeric material. Examples of the elastomer for the cladding are cross-linked materials of liquid fluorine-containing polymer, fluorine-containing liquid siloxane polymer, liquid dimethylsiloxane polymer (when the core material is not dimethylsiloxane polymer) and mixtures thereof. Examples of the non-elastomeric material are polymethyl methacrylate, polystyrene, fluororesin and the like.

In a preferred embodiment of the present invention, the cladding is coated around the core simultaneously with the formation of the core.

In this embodiment, a liquid polymer for the cladding is flowed down as an outer layer of the liquid polymer for the core and cross-linked.

Figure 2:
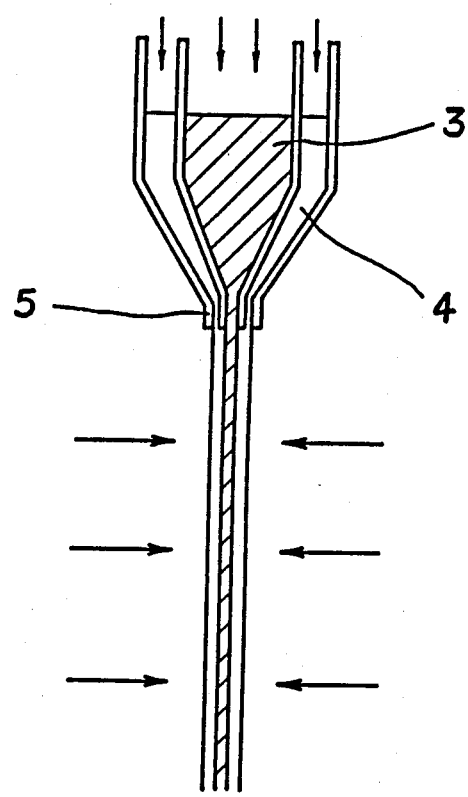

As shown in FIG. 2, the liquid polymers for the cladding and the core are supplied from feed tanks 3 and 4, respectively to a concentric nozzle 5 and flowed down. The feed tanks may be pressurized.

In this embodiment, since the polymers are simultaneously flowed down, the core material is not in contact with the atmosphere so that the surface of the core is not contaminated with impurities which increase attenuation of light transmission. In addition, since both polymers flow down from the concentric nozzle, the interface between the core and the cladding is very smooth so that any irregularity is not formed.

Specific examples of the liquid polymer for the cladding are liquid fluorine-containing polymer, fluorine-containing liquid siloxane polymer, liquid dimethylsiloxane polymer (when the liquid polymer for the core is not the liquid dimethylsiloxane polymer) and mixtures thereof.

Practically and presently preferred embodiments of the present invention is shown in the following examples.

EXAMPLE 1

From a nozzle with an inner diameter of 2 mm set at a height of about 2 m, a mixture of dimethylsiloxane polymer having vinyl groups at chain ends (100 g), methylhydrogensiloxane-dimethylsiloxane copolymer (10 g) and a solution of $H_2PtCl_6$ in isopropanol (containing 10 ppm of platinum metal as converted) was flowed down. The mixture being flowed down was heated in a furnace of about 1 m in length and 30 mm in diameter. The furnace was heated with a nichrome wire and its inner surface temperature was about 800° C. Thereby, a fibrous elastomer with rubber elasticity having a diameter of 0.3 mm was continuously produced without break.

Around the fiber, a 10% solution of a vinylidene fluoride/hexafluoropropylene/tetrafluoroethylene terpolymer in methyl ethyl ketone was dip coated to produce an optical fiber, which had transmission loss of 1,000 dB/km at a wavelength of 659 nm.

EXAMPLE 2

A concentric nozzle consisting of an inner nozzle of 2 mm in diameter and an outer nozzle of 4 mm in diameter was set at a height of 2 m. From the inner nozzle, as the core material, a mixture of diphenyldimethylsiloxane polymer (100 g), methylhydrogensiloxane-dimethylsiloxane copolymer (10 g) and a solution of $H_2PtCl_6$ in isopropanol (containing 10 ppm of platinum metal as converted) was flowed down, and simultaneously, from the outer nozzle, as the cladding material, a mixture of dimethylsiloxane polymer (100 g), methylhydrogensiloxane-dimethylsiloxane copolymer (10 g) and a solution of $H_2PtCl_6$ in isopropanol (containing 10 ppm of platinum metal as converted) was flowed down. The mixtures being flowed down were heated in a furnace of about 1 m in length and 30 mm in diameter. The furnace was heated with a nichrome wire and its inner surface temperature was about 800° C. Thereby, an optical fiber with rubber elasticity having a core diameter of 0.3 mm was continuously produced without break. The optical fiber had transmission loss of 800 dB/km at a wavelength of 650 nm.

COMPARATIVE EXAMPLE

The mixture of the core material used in Example 1 was poured in a tube of 0.3 mm in inner diameter made of tetrafluoroethylene-hexafluoropropylene copolymer and cured at 150° C. to produce an optical fiber. Its transmission loss was 5,000 dB/km at a wavelength of 650 nm.

What is claimed is:

1. A method for producing an elastomeric optical fiber comprising the steps of:
   flowing down a liquid polymer for the core and simultaneously cross-linking the polymer to form a core made of an elastomer with rubber elasticity, and
   applying the cladding around the core simultaneously with or after the formation of the core so as to surround the core.

2. The method according to claim 1, wherein a liquid polymer for the cladding is simultaneously flowed down around the core polymer being flowed down, and cross-linked.

3. The method according to claim 1, wherein the cladding comprises an elastomer with rubber elasticity.

4. The method according to claim 1, wherein the liquid polymer for the core is one selected from the group consisting of liquid butadiene polymer, liquid fluorine-containing polymer, liquid siloxane polymer, liquid acrylonitrile-butadiene copolymer and a mixture thereof.

5. The method according to claim 4, wherein the liquid polymer for the core is liquid siloxane polymer.

6. The method according to claim 5, wherein the liquid siloxane polymer is dimethylsiloxane polymer.

7. The method according to claim 5, wherein the liquid siloxane polymer is liquid siloxane polymer having phenyl or naphthyl groups.

8. The method according to claim 2, wherein the liquid polymer for the cladding is one selected from the group consisting of liquid fluorine-containing polymer, liquid dimethylsiloxane polymer, and a mixture thereof.

9. The method according to claim 1, wherein the cladding is applied around the core by dip coating the core in a solution of a vinylidene fluoride/hexafluoropropylene/tetrafluoroethylene terpolymer in methyl ethyl ketone.

10. The method according to claim 1, wherein the core comprises a mixture of dimethylsiloxane polymer having vinyl groups at the chain ends, methylhydrogensiloxane-dimethylsiloxane copolymer, and a solution of $H_2PtCl_6$ in isopropanol.

11. The method according to claim 1, wherein the core comprises a mixture of diphenyldimethylsiloxane polymer, methylhydrogensiloxane-dimethylsiloxane copolymer, and a solution of $H_2PtCl_6$ in isopropanol.

12. The method according to claim 11, wherein the cladding comprises a mixture of dimethylsiloxane polymer, methylhydrogensiloxane-dimethylsiloxane copolymer, and a solution of $H_2PtCl_6$ in isopropanol.

13. The method according to claim 12, wherein the cladding mixture simultaneously flows down with the core mixture.

* * * * *